United States Patent [19]

Reznicek

[11] 4,052,584
[45] Oct. 4, 1977

[54] METHOD AND APPARATUS FOR CUTTING INSULATING MATERIAL

[75] Inventor: Kurt Reznicek, Allentown, Pa.

[73] Assignee: Bell Telephone Laboratories, Incorporated, Murray Hill, N.J.

[21] Appl. No.: 681,754

[22] Filed: Apr. 29, 1976

[51] Int. Cl.² .................................. B23P 1/08
[52] U.S. Cl. .................... 219/69 M; 83/15; 83/788; 219/69 W
[58] Field of Search ............... 219/69 M, 69 W, 69 R, 219/383, 384, 68; 83/15, 16, 170, 788, 789; 29/25.35; 310/9.6

[56] References Cited

U.S. PATENT DOCUMENTS

| | | | |
|---|---|---|---|
| 3,723,690 | 3/1973 | Nakada et al. | 219/69 M |
| 3,731,043 | 5/1973 | Ullmann et al. | 219/69 W |
| 3,822,374 | 7/1974 | Ullmann et al. | 219/69 W |
| 3,849,624 | 11/1974 | Dulebohn et al. | 219/69 W |

OTHER PUBLICATIONS

"Agiecot Dem 15" Industrial Electronics Ltd., 9/75.

Primary Examiner—Bruce A. Reynolds
Attorney, Agent, or Firm—Lucian C. Canepa; Maurice de Picciotto

[57] ABSTRACT

A method and an apparatus for cutting insulating material (e.g., quartz) having a conductive layer on the surface thereof includes the use of a thin copper wire having diamond particles imbedded therein. The wire is moved in a direction perpendicular to the surface of the material. A source of potential is coupled between the wire and the layer, and a liquid solution is supplied between the wire and the conductive layer resulting in electro-erosion of portions of the layer proximate to the wire. A tension sensor detects wire displacements at the quartz cutting site and controls a wire-to-layer gap detector which in turn interrupts the displacement of the insulating material.

11 Claims, 4 Drawing Figures

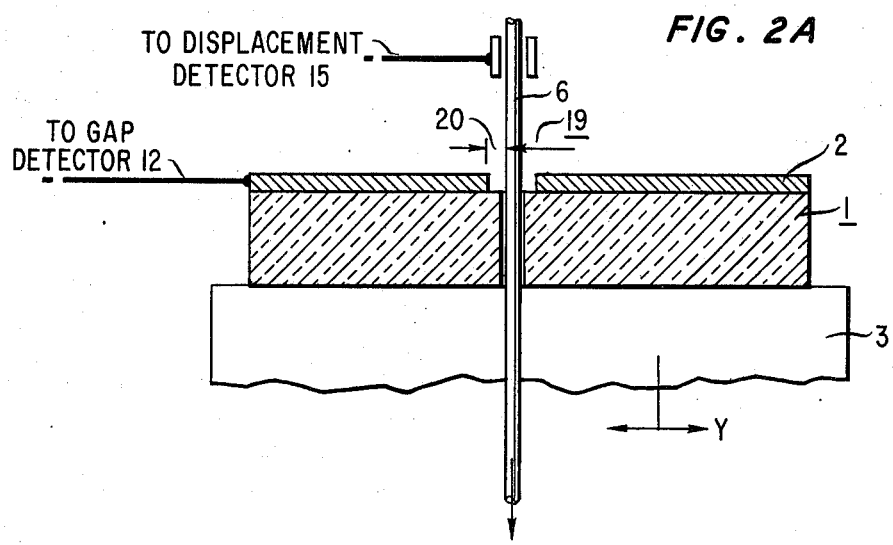
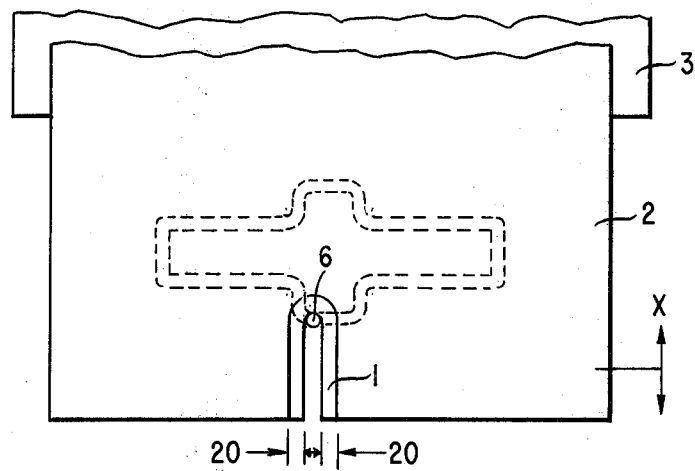
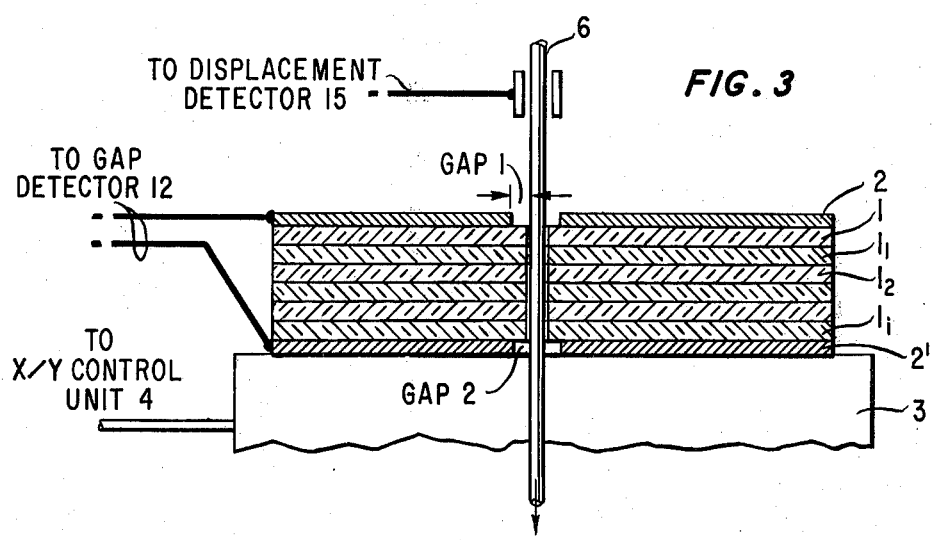

METHOD AND APPARATUS FOR CUTTING INSULATING MATERIAL

BACKGROUND OF THE INVENTION

The present invention relates to a method and an apparatus for cutting insulating materials. In particular, the present invention is directed to cutting quartz crystal plates for use in electromechanical filters and resonators.

Wire electro-erosion machining is a known process for cutting conducting materials by means of a wire electrode. In such a known method and apparatus, a continuously moving copper wire is positioned proximate to the conducting material to be cut. A difference in potential is imposed between the wire and the material while a liquid solution, e.g., deionized water, is fed coaxially to the wire. A multitude of electric discharges occurs between the wire and the material causing a cut in such material by electro-erosion. This known technique results in a contact-free machining process without exerting force on the conducting material. Simple as well as complex patterns can be achieved in accordance with this prior art arrangement. However, the latter is limited in its applicability to conducting workpieces made, for example, of steel or copper. This known method is inapplicable for cutting insulating materials such as quartz plates.

A known method for cutting piezoelectric crystals is described by W. P. Mason in "Piezoelectric Crystals and their Application to Ultrasonics", 1950, pages 167–168. In accordance with this method, cutting is performed by a wet-string type saw consisting of a plurality of endless strings running over pulleys. After cutting a crystal, the edges of such formed crystal plates must be ground to give a flat and straight edge finish. This method is adequate for cutting crystal plates. However, the frequency of such plates must be further adjusted by modifying the plates' dimensions. In other words, this prior art method and apparatus provides rough or uneven cuts and may cause undesirable stresses in the crystal. Although such a known method is acceptable for certain applications, it cannot be easily used where a very thin plate of quartz has to be cut in accordance with a predetermined pattern.

BRIEF DESCRIPTION OF THE INVENTION

The foregoing problems are solved in accordance with an embodiment of the present invention wherein a method for cutting insulating material comprises the steps of covering a surface of the insulating material with a conductive layer, mounting the insulating material on a base coupled to a displacement-control unit, positioning a cutting member against the insulating material in a direction substantially perpendicular to the base, moving the cutting member along that direction, imposing a potential difference between the cutting member and the conductive layer, supplying a liquid solution at the cutting site between the cutting member and the conductive layer, and monitoring member deviations proximate the cutting site during the moving step for controlling the displacement-control unit.

In a particular illustrative embodiment of the present invention, the cutting member comprises a thin metallic wire having a plurality of diamond particles embedded therein, and the insulating material is quartz.

An illustrative embodiment of an apparatus for cutting insulating material according to the foregoing method comprises a base for supporting the insulating material, the material having a conductive layer on the surface thereof, a displacement-control unit coupled to the base for selectively moving the base, a cutting member positioned against the insulating material in a direction substantially perpendicular to the base, a rotating arrangement for moving the cutting member along that direction, a potential source for imposing a potential difference between the cutting member and the conductive layer, a reservoir for supplying a liquid solution at the cutting site between the cutting member and the conductive layer, a gap detector for generating control signals in response to distance variations between the cutting member and the conductive layer at the cutting site for controlling the displacement-control unit and a sensing device for detecting tensions on the cutting member for controlling the gap detector.

One object of the present invention is to achieve a highly accurate method and an apparatus for cutting insulating material according to a predetermined path or pattern.

Another object of the present invention is to realize a method and an apparatus for cutting thin insulating material while monitoring tensions on the cutting member thereby preventing it from breaking.

A still further object of the present invention is to monitor the cutting member deviations and control the movements of the insulating material accordingly to achieve smooth and parallel edges at the cut.

These and other objects and advantages of this invention will appear more fully upon consideration of the various illustrative embodiments now to be described in detail in connection with the accompanying drawings.

BRIEF DESCRIPTION OF THE DRAWINGS

FIGS. 2A and 2B, respectively, illustrate a top and side enlarged view of a portion of the apparatus of FIG. 1; and FIG. 3 is a side view of a portion of an apparatus made in accordance with another illustrative embodiment of the present invention.

DETAILED DESCRIPTION OF THE DRAWINGS

Figure 1:
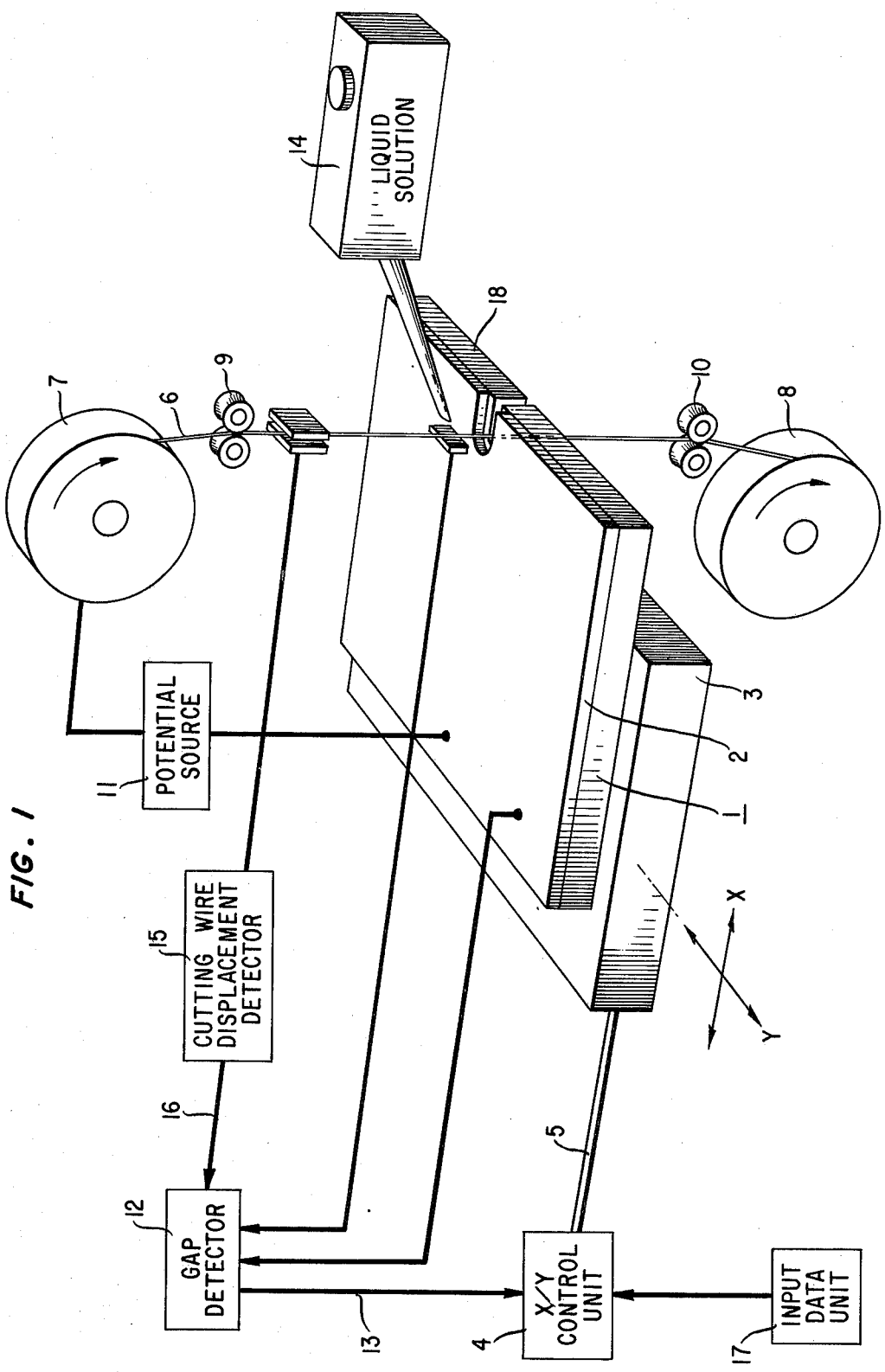
FIG. 1 shows an illustrative embodiment of an apparatus made according to the present invention.

Referring now to an illustrative embodiment of the invention, as shown in FIG. 1, an apparatus for cutting a workpiece 1 made of insulating material comprises a base 3 coupled to a displacement-control unit 4 for selectively moving the base in an X-Y plane. The displacement-control unit 4 is mechanically coupled through linkage 5 to the base or table 3, and controls the movements of the table in accordance with a predetermined set of displacement patterns. Such predetermined patterns are fed to the displacement-control unit 4 by any suitable means such as computer tapes or cards. The workpiece 1 is coated on one of its surfaces with a conducting layer 2. Such a layer can be deposited on the insulating material 1 by any suitable and convenient technique such as vapor deposition, plating, or sputtering. Alternatively, such a conducting layer can be positioned proximate to the surface of workpiece 1 by means, for example, a double-faced tape.

In the illustrative embodiment of FIG. 1, a cutting member 6 is positioned substantially perpendicular to the base 3. By way of example only, the cutting member 6 is preferably made of a thin copper wire having diamond particles imbedded therein. But other types of metallic cutting members can be used to replace the copper wire 6. The cutting wire 6 is moved in a vertical direction in FIG. 1 by means of a feeding reel 7 and a receiving reel 8. Pairs of wire guiding rollers 9 and 10 guide the cutting wire 6 in a direction substantially perpendicular to the major surface of insulating material 1. By way of example only, insulating material 1 will be hereafter referred to as a quartz plate. However, the principles of the present invention are also applicable to other insulating materials, such as mica, glass, etc.

A potential source 11 has one terminal coupled to the cutting wire 6 and the other terminal coupled to the conducting layer 2. In accordance with the known wire electro-erosion machining process described above, a gap detector 12 is coupled between the cutting wire 6 and the conducting layer 2. The gap detector has an output lead 13 coupled to the X-Y displacement-control unit 4. The main function of the gap detector 12 is to monitor the distance between the cutting wire 6 and the conducting layer 2 at the cutting site and to generate a control signal on its output lead 13 for controlling the displacement unit 4. Such a gap detector can, for example, measure the capacitance between the cutting wire 6 and the conductive layer 2 at the cutting site, and generate an electrical control signal on output lead 13 as long as the capacitance is below a predetermined threshold value. Alternatively, gap detector 12 can be inserted in the electrical circuit formed by potential source 11, cutting wire 6 and conductive layer 2 to measure current variations between the wire and the layer at the cutting site, and to generate control signals dependent thereof. A liquid solution, for example, deionized water, is provided at the cutting site coaxially with the cutting wire 6 by means of an arrangement schematically shown by reference numeral 14 in FIG. 1.

In accordance with the principles of the present invention, the specific illustrative embodiment shown in FIG. 1 comprises a wire displacement detector 15 positioned near the cutting site for detecting wire deviations in directions other than the vertical moving direction of wire 6. In response to such wire deviations, the displacement detector 15 generates a signal on its output lead 16 for inhibiting the gap detector 12 and preventing any control signal from being generated on output lead 13 of the detector 12.

In the embodiment of FIG. 1, once input data from unit 17 is fed to the X-Y displacement-control unit 4 for cutting the quartz plate in accordance with a programmed pattern, table 3 is controlled to start moving in the X direction until the cutting wire 6 touches the edge of plate 1. Deionized water is then supplied to the site where wire 6 touches the edge 18 of the quartz plate 1. A potential is then imposed between the conducting wire 6 and the conducting layer 2 while reels 7 and 8 start moving the wire in the vertical direction. At that point, while the wire is just touching the edge of the plate 1, no cutting of the plate is taking place. In accordance with the known electro-erosion technique, a small part of the conducting layer 2 proximate to the wire 6 will be removed by electric discharge cutting. As the displacement control unit 4 starts moving the table 3 (via the mechanical linkage 5) further in the X direction, the diamond-imbedded copper wire 6 will start cutting into the quartz plate 1 while keeping at a very small distance from the conducting layer 2.

As the cutting wire 6 is moving downwards in FIG. 1 and table 3 is moving in the X direction, there exists a gap between the wire and the conducting layer at the cutting site. Such a gap is overemphasized in FIG. 2A of the drawing. As long as the gap between the wire and the layer remains above a predetermined value, gap detector 12 generates a control signal on its output lead 13 for continuously enabling the operation of the displacement-control unit 4. In the event of a change in direction of the base 3, such as a move in the Y direction, cutting wire 6 would be deviated in the Y direction and would not be perpendicular to the surface of the quartz plate 1 at the cutting site. If the cutting process continues under these conditions, wire 6 would break due to lateral tensions imposed on it. Furthermore, the edges at the cutting site would be at an angle different than 90 degress from the major surface of the quartz plate. In order to avoid the foregoing, the cutting process should be stopped at that point to enable the cutting wire 6 to regain a vertical position perpendicular to the conductive layer 2. This is achieved by means of the wire displacement detector 15 generating an inhibiting signal on its output lead 16 for stopping, via the gap detector 12, the operation of the displacement-control unit 4. Once the wire is back to its vertical and straight position, the wire displacement detector 15 will end its inhibiting signal on lead 16, and the gap detector 12 will start functioning again and command, by means of control signals on output lead 13, the operation of the control unit 14. The wire displacement detector can be either of a wire tension-sensing type or physical displacement type. For example, such a displacement detector can comprise a plurality of photoelectric cells that detect movement of the wire in any vertical plane perpendicular to the surface layer 2. Alternatively, the wire displacement detector can comprise a pair of wire rollers with means for measuring the tension of the wire therebetween and generating an electrical signal as soon as the tension on the cutting wire deviates from a predetermined value.

In accordance with the principles of the present invention, the quartz plate 1 can be cut in any desired shape and form such as rectangular, circular, elliptical or of the Straubel contour type described in "Piezoelectricity" by W. G. Cady, 1946, page 458. Various shapes and forms can be achieved depending on the input data fed from the unit 17 to the displacement-control unit 4.

As shown in FIG. 2A, at the cutting site 19 a gap 20 exists between the wire 6 and the edges of the conducting layer 20. Such a gap is, for example, of the order of 7/10 of a mil. Illustratively, the copper wire 6 has a diameter ranging from 3 to 10 mils, preferably between 6 and 8 mils. Therefore the width of the opening in the quartz plate 1 is approximately the dimension of the cutting wire 6, that is, of the order of 10 mils. The quartz plate 1 is a thin plate used, for example, as a piezoelectric resonator or filter. Such a plate of the type used in a Monolithic Crystal Filter described in U.S. Pat. No. 3,564,463 to W. D. Beaver and R. A. Sykes, issued Feb. 16, 1971, would have a thickness dimension of the order of 8 mils. However, quartz plates having thicknesses between 0.5 and 20 mils can be shaped in accordance with the cutting method of the present invention.

In accordance with another illustrative embodiment of the invention, a plurality of plates 1, $1_1$, $1_2$ ... $1_i$ (FIG. 3) are stacked in order to achieve by a single cutting operation a plurality of identically patterned plates. In such an embodiment, a pair of conducting layers 2 and 2' are advantageously used to control the gaps between the wire and the layers at the top and bottom surface of such a stacked configuration. As shown in FIG. 3, variations in both GAP 1 and GAP 2 control the gap detector 12 which, in turn, controls the displacement-control unit 4.

In both embodiments described above, the cutting wire 6 is moved in the vertical direction at a speed of the order of 0.20 inch per sec. Conducting layers 2 and 2' are thin metal layers made, for example, of copper, each having a thickness of approximately 20 mils.

It is to be understood that the embodiments described herein are merely illustrative of the method and apparatus according to the present invention. Various modifications may be made thereto by persons skilled in the art without departing from the spirit and scope of the invention.

What is claimed is:

1. Apparatus for cutting insulating material comprising:
   a base for supporting the insulating material, said material having a conductive layer proximate to the surface thereof;
   displacement-control means coupled to the base for selectively moving said base;
   a cutting member adapted to be positioned against said insulating material in contacting relationship therewith in a direction substantially perpendicular to said base;
   means for moving said cutting member along said direction thereby abrasively cutting said insulating material;
   means adapted to be connected to a voltage source for imposing a potential difference between said cutting member and said conductive layer;
   means for supplying a liquid solution at the cutting site between said cutting member and said conductive layer thereby causing a gap to be formed between said member and said layer at the cutting site by electro-erosion machining;
   means for generating control signals in response to distance variations of said gap between said cutting member and said conductive layer at the cutting site for controlling said displacement means; and
   means for detecting tensions on said cutting member for controlling said generating means.

2. Apparatus for cutting insulating material according to claim 1, wherein said cutting member comprises a thin copper wire having diamond particles imbedded therein.

3. Apparatus for cutting insulating material according to claim 2, wherein said tension detecting means comprises a wire displacement detector positioned near the cutting site for sensing wire deviations in directions other than said wire moving direction.

4. Apparatus for cutting insulating material according to claim 3, wherein said wire displacement detector generates signals in response to said deviations for inhibiting said control signals generating means thereby interrupting movement of the base.

5. Apparatus for cutting insulating material having a conductive layer on the surface thereof comprising:
   a table for supporting the insulating material;
   an X—Y drive coupled to the table for selectively moving said table in accordance with predetermined movement patterns,
   a thin metal cutting wire, having a plurality of diamond particles imbedded therein, positioned against said insulating material in contacting relationship therewith in a direction substantially perpendicular to said table;
   wire feeding and receiving reels for moving said cutting wire along said direction thereby abrasively cutting said insulating material;
   circuit means comprising a potential source coupled to said cutting wire and to said conductive layer for imposing a potential difference therebetween;
   a reservoir for supplying a liquid solution between said cutting wire and said conductive layer thereby causing a gap to be formed between said wire and said layer at the cutting site by electro-erosion machining;
   a gap detector coupled to said wire and said layer for detecting distance variations therebetween at the cutting site and generating movement control signals coupled to said X-Y drive; and
   a wire tension sensing device coupled to said gap detector for sensing displacements of said wire in directions other than said moving direction and inhibiting the generation of said movement control signals.

6. Method for cutting insulating material comprising the steps of:
   coating a surface of the insulating material with a conductive layer;
   mounting said insulating material on a base coupled to displacement means;
   positioning a cutting member against said insulating material in contacting relationship therewith in a direction substantially perpendicular to the base;
   imposing a potential difference between the cutting member and the conductive layer;
   moving the cutting member along said direction thereby abrasively cutting said insulating material;
   supplying a liquid solution at the cutting site between the cutting member and the conductive layer thereby causing a gap to be formed between said member and said layer at the cutting site by electro-erosion machining; and
   monitoring said cutting member deviations proximate the cutting site during said moving step for controlling said displacement means.

7. Method for cutting insulating material according to claim 6, wherein the monitoring step comprises the steps of:
   generating control signals in response to variations in distance between the cutting member and the conductive layer at the cutting site for controlling said displacement means; and
   detecting tensions on said cutting member for controlling the signal generating step.

8. Method for cutting insulating material according to claim 7 wherein the insulating material comprises a quartz plate and wherein the method comprises the step of positioning a thin copper wire having a plurality of diamond particles imbedded therein against said quartz plate and moving said wire between feeding and receiving reels.

9. Method for cutting insulating material according to claim 8, wherein the tension detecting step comprises positioning a wire displacement detector near the cutting site, and sensing the cutting wire deviations in directions other than said moving direction.

10. Method for cutting insulating material according to claim 9, wherein the sensing step inhibits said control signal generating step in response to said wire deviations thereby interrupting the movement of the quartz plate.

11. Method for cutting insulating material having a conductive layer on the surface thereof comprising the steps of:

mounting said insulating material on a base coupled to displacement means;

positioning a cutting member against said insulating material in contacting relationship therewith in a direction substantially perpendicular to the base;

imposing a potential difference between the cutting member and the conductive layer;

moving the cutting member along said direction thereby abrasively cutting said insulating material;

supplying a liquid solution at the cutting site between the cutting member and the conductive layer thereby causing a gap to be formed between said member and said layer at the cutting site by electro-erosion machining; and monitoring said cutting member deviations proximate the cutting site during said moving step for controlling said displacement means.

* * * * *